April 22, 1924.
D. D. CHILDERS
PARQUET BLOCK ASSEMBLING MACHINE
Original Filed May 17, 1922  5 Sheets-Sheet 2
1,491,335
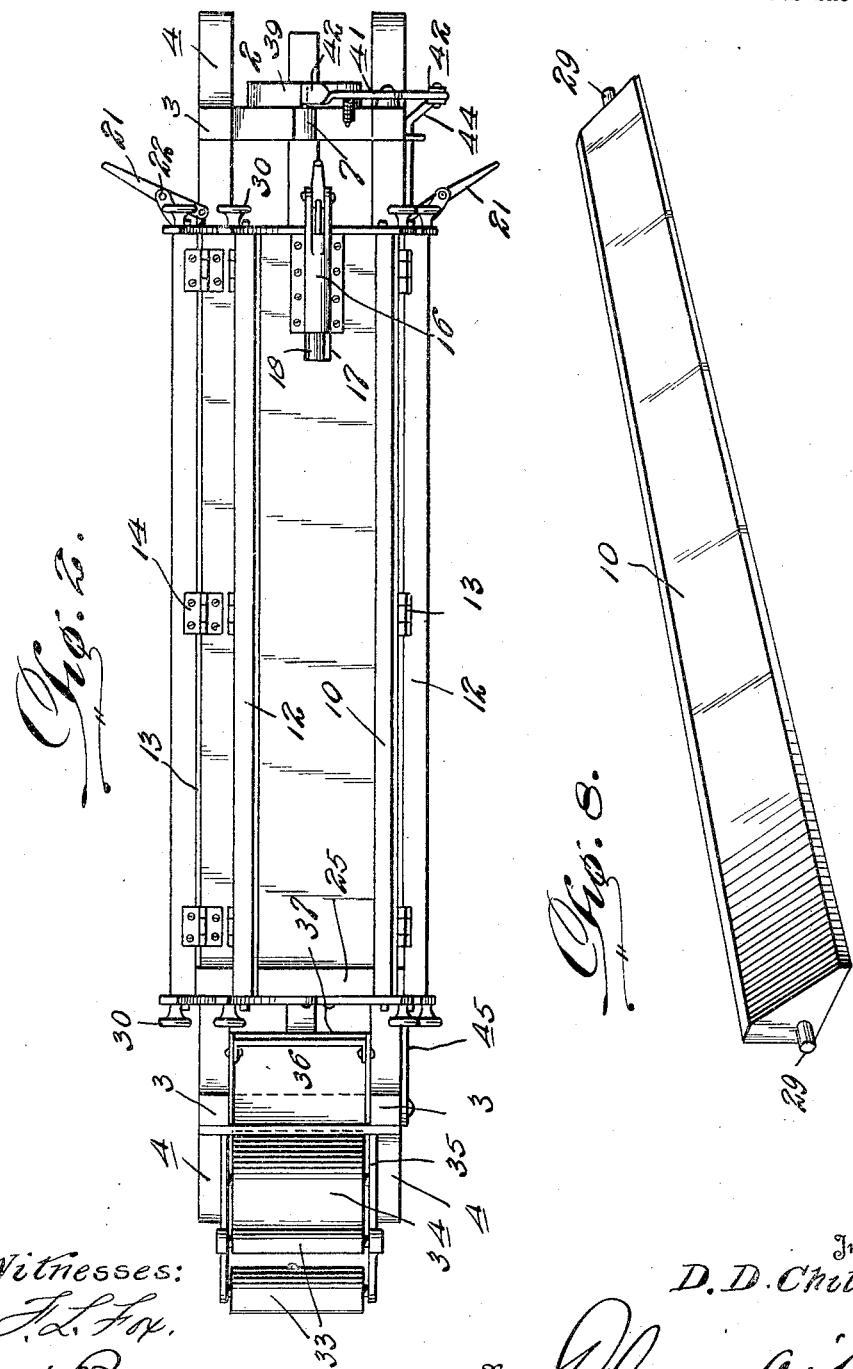

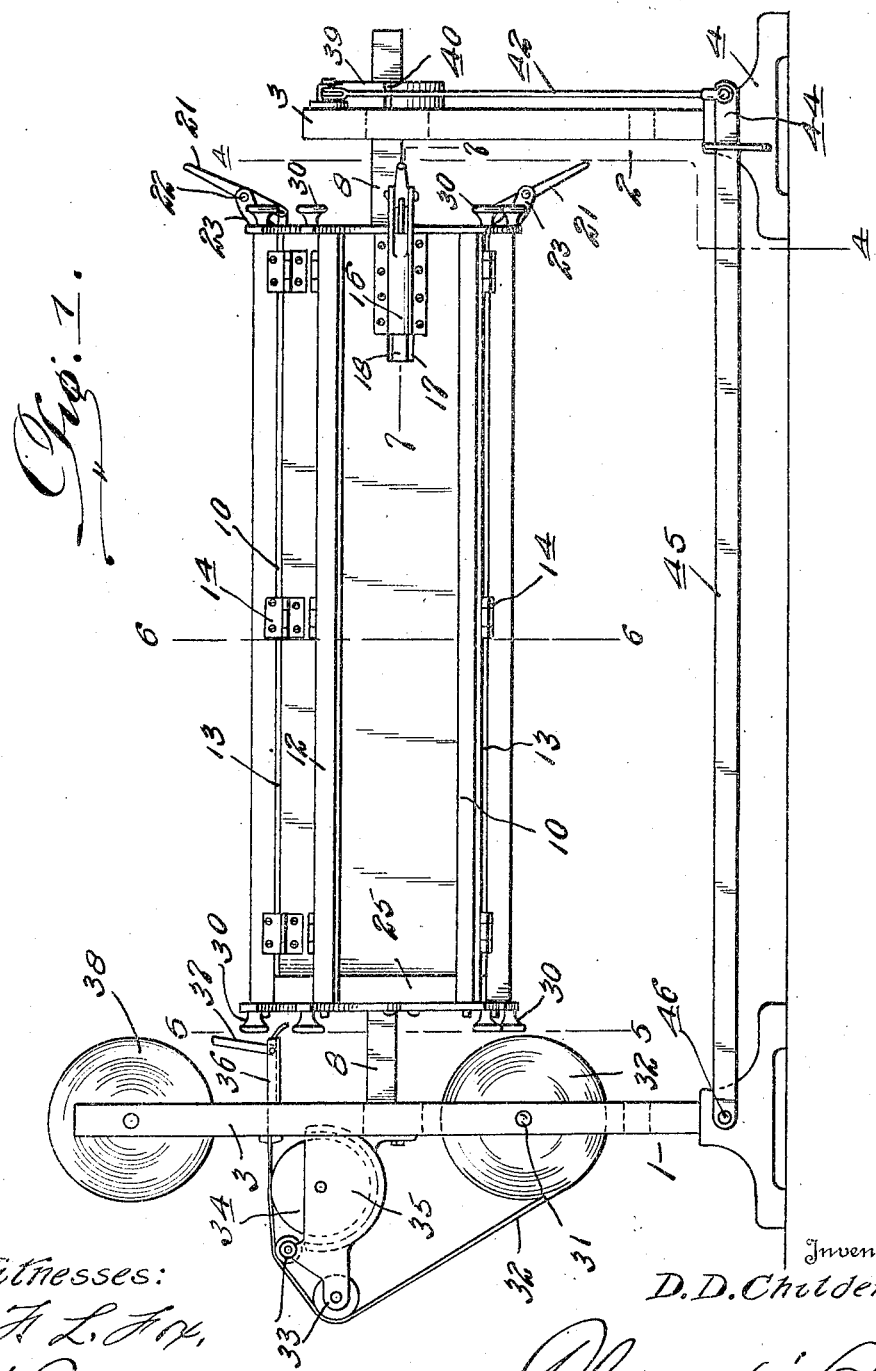

April 22, 1924. 1,491,335
D. D. CHILDERS
PARQUET BLOCK ASSEMBLING MACHINE
Original Filed May 17, 1922    5 Sheets-Sheet 3
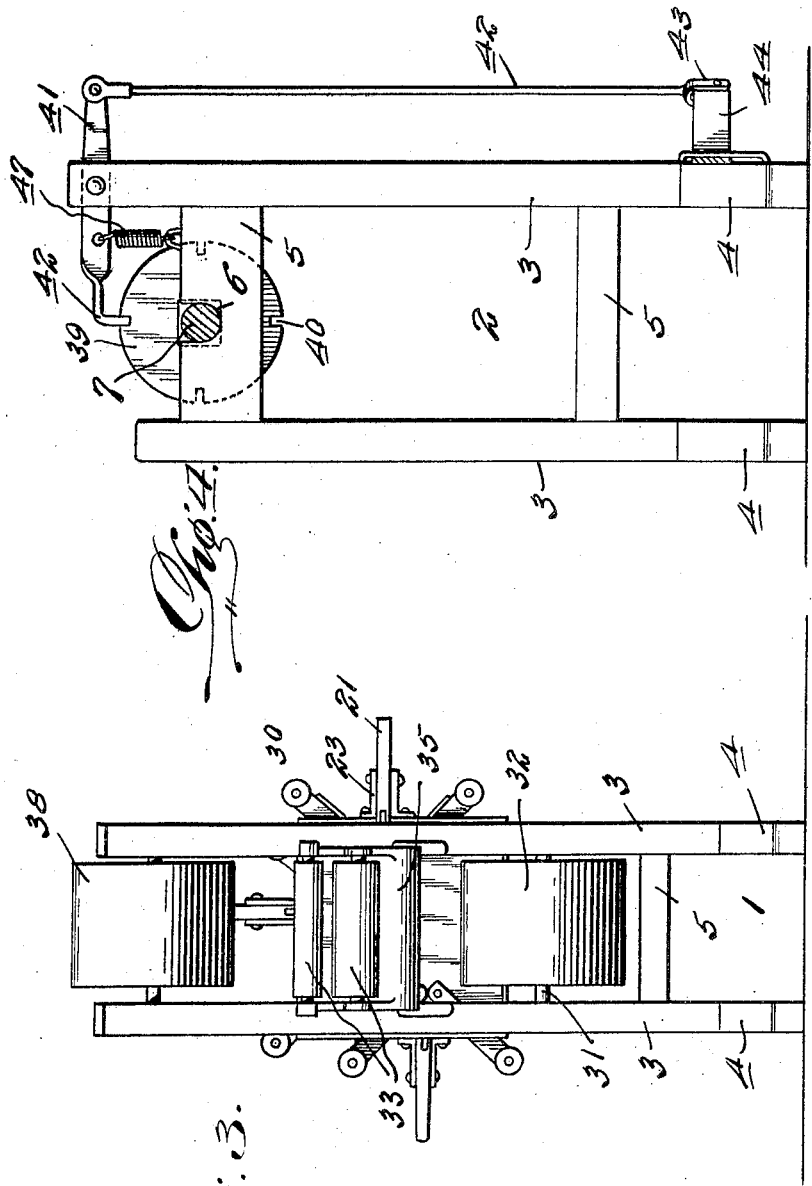
Witnesses:
F. L. Fox,
H. Berman
Inventor
D. D. Childers,
By Clarence A. O'Brien
Attorney

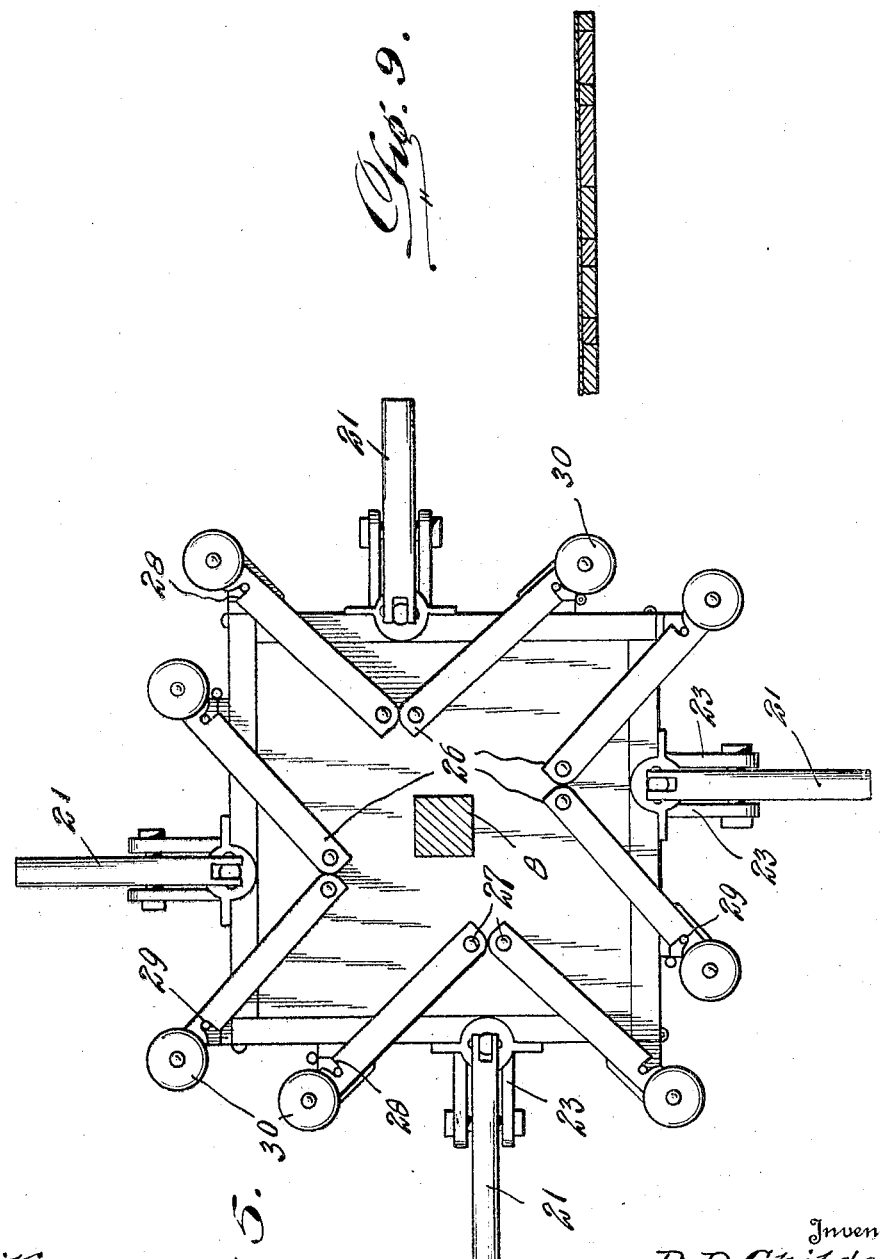

April 22, 1924.
D. D. CHILDERS
PARQUET BLOCK ASSEMBLING MACHINE
Original Filed May 17, 1922    5 Sheets-Sheet 5
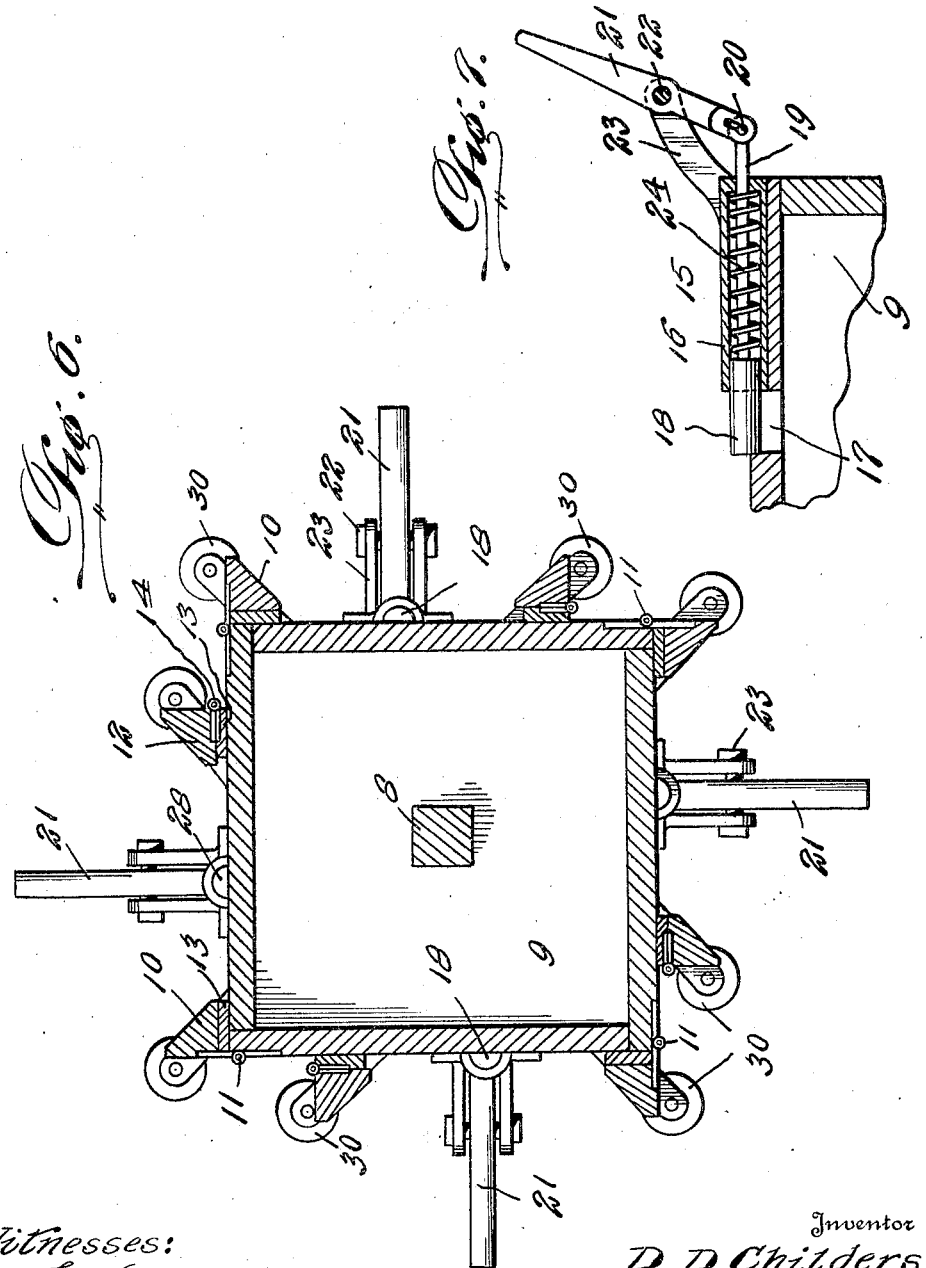

Patented Apr. 22, 1924.

1,491,335

UNITED STATES PATENT OFFICE.

DALLAS D. CHILDERS, OF ELKINS, WEST VIRGINIA.

PARQUET-BLOCK-ASSEMBLING MACHINE.

Application filed May 17, 1922, Serial No. 561,760. Renewed March 8, 1924.

*To all whom it may concern:*

Be it known that I, DALLAS D. CHILDERS, a citizen of the United States, residing at Elkins, in the county of Randolph and State of West Virginia, have invented new and useful Improvements in Parquet-Block-Assembling Machines, of which the following is a specification.

In carrying out the present invention it is my purpose to provide a machine whereby parquet blocks may be assembled quickly and conveniently into the desired designs and removed from the machine in assembled condition by the operator for use.

It is also my purpose to provide a machine of the class described which will embody comparatively few parts and these so arranged and correlated as to reduce the possibility of derangement to a minimum and which may be conveniently and easily manipulated by the operator.

A further object of my invention is the provision of a machine for assembling parquet blocks whereby the molds may be moved into and out of working position so that as each mold is filled a further mold may be brought into position and wherein the molds will be held against accidental movement in the assembling of the blocks.

With the above recited objects in view, and others of like nature, the invention resides in the construction, combination and arrangement of parts set forth in and falling within the scope of the appended claims.

In the accompanying drawings:

Figure 1 is a view in side elevation of a machine constructed in accordance with my invention.

Figure 2 is a top plan view of the same.

Figure 3 is an end view thereof.

Figure 4 is a section on the line 4—4 of Figure 1.

Figure 5 is a sectional view on the line 5—5 of Figure 1.

Figure 6 is a sectional view on the line 6—6 of Figure 1.

Figure 7 is a fragmentary sectional view of the clamping unit.

Figure 8 is a perspective view of one of the mold forming elements.

Figure 9 is a sectional view through the parquet blocks assembled.

Referring now to the drawings in detail, 1, 2 indicate vertical supports each comprising, in the present instance, vertical legs 3, 3, uprising from base members 4, 4 and connected together by the bars 5 arranged horizontally.

The upper tie bars 5 of the respective supports 1 and 2 are in the same horizontal plane and are provided with axially alining bearings 6 in which are journaled the rounded portions 7 of a shaft 8 which in this instance is square in cross section and extends across the space between the supports 1 and 2.

Fixed upon this shaft 8 is a multiple sided drum 9 through which the shaft extends longitudinally at the center of said drum. In the present instance the drum 9 is square in cross section and the respective sides thereof are equipped to form molds for the parquet blocks so that the latter may be formed into the desired designs.

In this embodiment of my invention the mold forming equipment comprises a longitudinal bar 10 arranged upon each flat face or side of the drum 9 at one edge thereof and hinged to the drum at such edge as at 11 and a longitudinal bar 12 on each flat face or side of the drum 9 spaced from the corresponding bar 10 and parallel therewith. Each bar 10, 12 is, in this case, triangular in cross section and has a flat side confronting the corresponding side of the drum and interposed between these flat surfaces are strips 13 respectively. The strip 13 between each bar 10 and the adjacent side of the drum is fixed to the bar 10, while the strip 13 between each bar 12 and the adjacent face or side of the drum is fixed to the drum and is hingedly connected as at 14 to the bar 12, the hinged portions being so arranged that the bar 12 may be swung in a direction away from the bar 10, as is clearly shown in Figure 6.

These bars 10 and 12 and the corresponding surfaces of the drum 9 constitute molds for holding the parquet blocks and at one end of each mold is a clamping unit 15 which comprises in the present case a casing 16 arranged at the longitudinal center line of the mold. This casing is seated in a depression in the face of the drum and the inner end thereof opens into a slot 17 formed in the face of the drum. Slidably mounted in the inner end of the casing is a plunger 18, the outer end of which extends into the slot 17 and is adapted to abut the remote end of the slot so that the movement of the plunger out of the casing will be limited. This plunger is formed with a rod 19 that extends through the outer end wall of the casing 16 and is connected through the medium of a pin and slot connection 20 with an operating lever 21 pivoted between its ends as at 22 upon a bracket 23 carried by the casing 16. Encircling the rod 19 within the casing 16 is a coiled expansion spring 24 having one end engaging the outer end of the casing and the other end abutting the plunger 18 to force the plunger outwardly of the casing. The other end of each mold is closed by a transverse strip 25 suitably secured to the flat face of the drum.

The drum 9 is designed to be rotated so that each flat face or side thereof may be brought in horizontal or working position and as each face is brought into such position the parquet blocks are set into the mold between the bars 10 and 12 and arranged along the bottom of the mold between the strip 25 and the other end of the drum and as the built up design approaches the plunger 18 the latter is pulled back against the action of the spring 24 by means of the lever 21. When the end of the section of parquet blocks are within the range of the bolt 18 the lever is released and the spring reacts and so moves the bolt into engagement with the built up section, thereby firmly clamping the blocks in position within the mold.

Suitable locking means are employed to hold the bars 10 and 12 in mold forming position, and in the present instance these means embody pairs of levers 26 pivoted to each end of the drum 9 as at 27 and corresponding in number to the faces of the drum. The outer ends of the levers of each pair project beyond the corresponding face of the drum as shown in Figure 5 and are formed with slots 28 that engage pins 29 at the ends of the bars 10, 12 and with handles 30, whereby the levers may be operated to locking and unlocking position. These levers are pivoted upon both ends of the drum, so that the bars 10 and 12 may be locked at both ends to the drum so as to be held properly in mold forming position.

Secured in the legs 3, 3 of the support 1 below the axis of the drum 9 is a transverse shaft 31 upon which is mounted a roll of paper 32 of suitable quality and of a width corresponding to that of the molds. The outer end of this paper is trained over guide rolls 33 and a paste applying roll 34 working in a paste receptacle 35 appropriately secured to the support 1, the paste receptacle also carrying, in this instance, the guide rolls 33, as shown in Figure 1.

The outer end of the paper also extends through a guide 36 that is carried by the support 1 and alines with the molds as they are brought into horizontal position, the guide being equipped with a knife 37 whereby the paper may be severed.

After the parquet blocks have been built up in the mold as previously described the paper is drawn along the mold and the pasty surface thereof engaged with the blocks and pressed thereon and cooperates with the bars 10 and 12 to hold the blocks in place. When the necessary length of paper is drawn the knife 37 is actuated to cut the same and as each mold is completed the drum is rotated to bring an empty mold into position for filling. As the drum is rotated the filled molds hold the built up sections until dry, and when dry the plungers are retracted and the bars 10 and 12 unlocked to release the sections which are then ready for use as shown in Figure 9.

If desired an addition roll of paper may be carried by the upper ends of the legs of the support 1, as at 38.

In order to hold the drum in position against accidental movement in the filling of molds a holding mechanism is employed. In the present instance the holding mechanism embodies a disk 39 fixed to the shaft 8 adjacent to the support 2 and formed with radial notches 40 spaced apart equi-distant and corresponding in number to the number of molds. Pivoted between its ends upon one of the legs 3 of the support 2 is a lever 41 having one end formed to provide a dog 42 engageable in the notches 40 and the other end connected with the upper extremity of a vertical connecting rod 42. The lower end of the rod 42 is formed with a yoke 43 that straddles and is pivoted to the offset end 44 of a treadle bar 45 that extends the full length of the machine and has its other end pivoted as at 46 to one of the base members of the support 1. A spring 47 has one end connected to the dog end of the lever 41 and the other end fastened to the support 2 and acts to hold the dog normally in engagement with the adjacent notch.

By means of the bar 45 which is within convenient reach of the foot of the operator the lever 41 may be operated to release the disk 39, thereby permitting the drum to be rotated when necessary or desired.

While I have herein shown and described one preferred form of my invention by way of illustration, I wish it to be understood that I do not limit or confine myself to the precise details of construction herein shown and described, as modifications and variations may be made within the scope of the claims and without departing from the spirit of my invention.

Having thus described the invention, what is claimed as new, is:—

1. In a parquet block assembling machine, a multiple sided drum, mold forming elements on each side of said drum, a shaft supporting said drum for rotary movement, means normally holding said drum against movement, means for releasing said holding means whereby the drum may be rotated to bring the sides thereof into horizontal position successively so that the parquet blocks may be assembled in the molds, and paper guiding means in line with the horizontal working side of said drum.

2. In a parquet block assembling machine, a multiple sided drum, mold forming elements on each side of said drum, a shaft supporting said drum for rotary movement, means normally holding said drum against movement, means for releasing said holding means whereby the drum may be rotated to bring the sides thereof into horizontal position successively so that the parquet blocks may be assembled in the molds, paper guiding means in line with the horizontal working side of said drum, a roll of paper adapted to be drawn through said paper guiding means and means for applying a paste to said paper as it is drawn through the paper guiding means.

3. In a parquet block assembling machine, a multiple sided drum, mold forming elements on each side of said drum comprising bars extending longitudinally of each side of the drum and spaced apart to form the sides of the mold, a strip on each face of the drum at one end thereof to close the mold and a clamping unit at the other end of each side of the drum, a shaft supporting said drum for rotary movement, a disk on one end of the shaft formed with radial notches corresponding in number and position with the number and position of the sides of the drum and a dog engageable in said notches to hold the drum against movement.

4. In a parquet block assembling machine, a multiple sided drum, mold forming elements on each side of said drum comprising bars extending longitudinally of each side of the drum and spaced apart to form the sides of the mold, a strip on each face of the drum at one end thereof to close the mold and a clamping unit at the other end of each side of the drum, a shaft supporting said drum for rotary movement, a disk on one end of the shaft formed with radial notches corresponding in number and position with the number and position of the sides of the drum, a dog engageable in said notches to hold the drum against movement, and a foot treadle connected to said dog whereby said disk may be relieved of the influence of the dog.

In testimony whereof I affix my signature.

DALLAS D. CHILDERS.